Dec. 6, 1966  J. H. MARTEN  3,290,309
SYNTHESIS OF MELAMINE
Filed Feb. 11, 1964
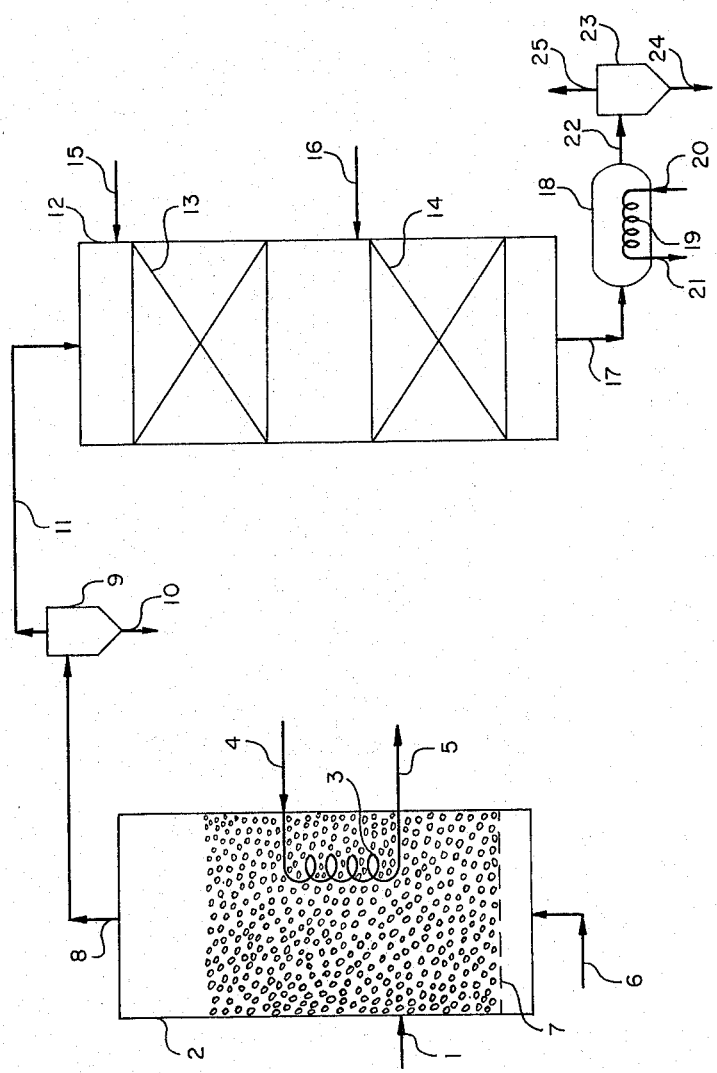
JEROME H. MARTEN
INVENTOR.
BY J. T. Chaboty
AGENT 3,290,309
SYNTHESIS OF MELAMINE
Jerome H. Marten, Nixon, N.J., assignor to Chemical Construction Corporation, New York, N.Y., a corporation of Delaware
Filed Feb. 11, 1964, Ser. No. 344,102
10 Claims. (Cl. 260—249.7)

This invention relates to the catalytic synthesis of melamine from urea. An improved catalytic process is provided, in which vaporized urea is passed through an improved combination of fluid and fixed catalytic beds for melamine synthesis.

Melamine can be produced by vaporizing molten urea, and passing the resulting urea vapor stream through one or several catalyst beds at elevated temperature. The urea forms melamine in accordance with the following equation:

(1) 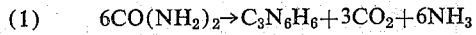$6CO(NH_2)_2 \rightarrow C_3N_6H_6 + 3CO_2 + 6NH_3$

The resulting vapor stream is partially condensed by cooling, to yield crude solid melamine and a mixed ammonia-carbon dioxide off-gas.

Numerous catalyst arrangements have been suggested for the catalytic synthesis step, including the provision of highly porous catalyst beds which may be in the fluidized state. Highly porous catalytic materials having a large internal surface area of 180 square meters per gram or higher such as silica gel, alumina gel and activated bauxite have been utilized as melamine synthesis catalysts. Although effective conversion of urea to melamine is attained using such catalysts, these materials are open to certain objections such as high cost, high attrition rates and catalyst loss due to the soft porous surfaces, and low gas velocities through the catalyst beds with concomitant low process capacity due to catalyst particle size.

In order to avoid some of the objections to highly porous catalysts, it has been suggested that the initial vaporization of the urea may be carried out in a fluid bed composed of catalytically inert material such as sand. In this case, a certain amount of in situ conversion of urea to melamine may take place due to in situ thermal effects. The resultant process stream is passed to a fixed catalytic bed containing the known highly porous catalysts, for final conversion of urea to melamine. In this case, a large amount of heat must be added during urea vaporization and throughput is reduced due to the lack of conversion during vaporization. In addition, a larger amount of catalyst is required in the relatively less efficient fixed catalyst bed which follows the vaporizer.

In the present invention, an improved process for the synthesis of melamine from urea is provided which features a catalytic fluid bed for urea vaporization and partial conversion, followed by one or more catalytic fixed beds for final and complete conversion of urea to melamine. It has been determined that substantial process and operating advantages are attained by provision of a catalytic material having an internal surface area substantially below that of the catalysts previously employed in melamine synthesis. Specifically, it has been found that provision of a fluid catalyst bed for urea vaporization and partial conversion, followed by a fixed catalyst bed or beds for final melamine synthesis, in which the catalytic material in the beds has an internal surface area in the range of 10 to 80 square meters per gram, attains complete conversion of urea to melamine while avoiding the disadvantages of prior art procedures.

Thus, the present invention provides numerous advantages as compared to the provision of an inert fluid bed for urea vaporization followed by a catalytic fixed bed. The use of catalytic material in the fluid vaporizer bed substantially lowers the heat requirement for urea vaporization as compared to the use of a non-catalytic or inert fluid vaporizer bed. This result follows because the melamine from vaporized urea synthesis reaction is exothermic, and thus the partial conversion of urea during vaporization adds heat to the system and aids in further urea vaporization, thus reducing the amount of external heat which must be added to the system. In addition, the use of catalytically active material in the fluid bed as well as the fixed bed reduces the catalyst requirement in the fixed bed and in addition reduces the need to remove the heat produced by melamine formation in the fixed bed, therefore giving much better heat recovery and a more economical heat balance in the process of the present invention, compared to prior procedures. This reduces the overall catalyst requirement, since as mentioned supra the catalytic fluid bed is more efficient in conversion per unit mass of catalyst than the fixed bed. Thus, higher throughputs may be attained at a given operating temperature. In addition, it will be evident that high capacity and complete conversion may be attained at a relatively lower operating temperature, thus reducing substantially the amount of melamine which is thermally decomposed in situ to yield melams and other decomposition products.

In addition, the provision of fluid and fixed catalyst beds having catalytic material with an internal surface area in the range of 10 to 80 square meters per gram provides substantial advantages as compared to the soft and highly porous catalytic materials previously employed and having large internal surface areas of 180 square meters per gram or higher. The less porous catalyst material of the present invention is substantially less costly than the high internal surface area catalysts. The present invention also provides catalyst material having substantially better physical characteristics than the soft, highly porous prior art catalysts. Due to a harder and stronger structure, less dusting and attrition takes place, particularly in the fluid bed, and thus less makeup catalyst is required in practice, for a given size of bed. Finally higher gas velocity may be maintained through the bed because the less porous catalyst employed in the present invention is denser. Thus higher throughputs are attained with the same size of equipment, or smaller vessel sizes may be provided for equal process capacity.

It is an object of the present invention to produce melamine from urea in an improved manner.

Another object is to vaporize urea with in situ catalytic conversion of urea vapor to melamine.

A further object is to provide improved catalytic material for the fluidized bed vaporization of urea and fixed bed catalytic conversion of urea vapor to melamine.

An additional object is to provide a catalytic material for the conversion of urea to melamine which is less costly and has improved physical characteristics.

Still another object is to provide a catalytic material for conversion of urea to melamine which is of reduced porosity with a harder and denser structure, such that the simultaneous fluid bed vaporization of urea and catalytic conversion to melamine may be carried out in a practical manner.

An object of the present invention is to produce melamine from urea by a more efficient catalytic process employing fluid and fixed catalyst beds.

These and other objects and advantages of the present invention will become evident from the description which follows. Referring to the figure, a flowsheet of the invention is presented. Urea feed stream 1 is passed into the fluid bed of the catalytic fluid bed vaporizer 2. The urea stream 1 will preferably consist of molten liquid urea, however solid urea may also be employed in the process. The fluid bed in vaporizer 2 is maintained at an elevated temperature in the range of 520° F. to 750° F. by internal heating coil 3, with heating fluid such as a molten salt being passed into coil 3 via stream 4 and discharged via stream 5. A minimum fluid bed temperature of 520° F. is desirable in order to attain usable vaporization rates and catalytic conversion to melamine, while a maximum temperature of 750° F. is desirable in order to avoid decomposition of ammonia, which is also present in the fluid bed as will appear infra. An optimum operating temperature range of 600° F. to 700° F. has been found to be preferable in practice.

A feed stream 6 consisting of ammonia vapor is also passed into the bottom of the unit, below particle retention screen 7. Stream 6 rises through the fluid bed and acts as a fluidization medium. In addition, excess ammonia is desirable during melamine synthesis from urea, in order to prevent the formation of melamine decomposition products. Thus, the weight ratio of stream 6 to urea feed stream 1 will be at least 0.7:1, and preferably about 1.5 to 1 or higher. Under these conditions, it has been determined that optimum fluidization of the bed is attained when the fluid bed particles have a particle size distribution in the range of 60 mesh to 200 mesh.

The particles in the fluid bed consist of any suitable melamine synthesis catalyst. Thus, the fluid bed may consist of such catalysts as activated alumina; an inorganic phosphorus compound such as phosphoric acid or boron phosphate deposited on a suitable carrier such as alumina, silica, mullite or quartz; or a fused mixture of solid urea, carbon black and an inorganic phosphorus-containing compound such as phosphoric acid. The latter catalyst will typically have an ultimate analysis of 43% carbon, 21% phosphorus, 18% nitrogen, 16% oxygen and 2% hydrogen. Alumina gel is not considered within the scope of the present invention, since it is not feasible to produce such material with an internal surface area in the range of 10 to 80 square meters per gram. Commonly known active melamine catalytic materials such as alumina gel or silica gel have a soft porous surface with a highly porous internal structure and internal surface area above 180 square meters per gram, and are not employed in the process of the present invention for reasons discussed supra.

A most important and critical aspect of the catalytic fluid bed of the present invention is that the catalyst particles must have an internal surface area in the range of 10 to 80 square meters per gram. Thus, the surface of each bed particle essentially contains large pores to the exclusion of smaller pores, and is harder and denser than the soft porous catalytic material of the prior art. As discussed supra, this physical characteristic assures the attainment of optimum operation in accordance with the present invention, with operating advantages as enumerated supra.

The fluidizing ammonia stream 6 rises through the catalytic fluid bed, and mixes with the urea vapor which is generated from urea feed stream 1 under the elevated temperature conditions maintained in the bed by heating coil 3. A concomitant partial conversion of urea vapor to melamine vapor takes place in the fluid bed, due to the catalytic action of the bed particles. Under selected optimum operating conditions of elevated temperature and gas velocity through the bed, a total conversion of at least 75% of the feed urea to melamine is preferably attained in the fluid bed.

An intermediate process gas stream 8 is withdrawn from unit 2 above the fluid bed, and principally contains urea, melamine, ammonia and carbon dioxide. Small amounts of melamine precursors such as biuret, cyanuric acid, ammeline and ammelide may also be present in stream 8. In addition, stream 8 may contain entrained small solid particles of catalyst derived from the fluid bed. In order to prevent plugging of the downstream fixed bed, the solid particles entrained in stream 8 are removed by passing the gas stream 8 into a gas-solids separator, such as cyclonic-shaped vessel 9. Unit 9 may be provided with suitable internal baffles, not shown. In vessel 9, the solid particles component of stream 8 is separated out by gravity, and settles down for removal as solids stream 10. Stream 10 may be suitably compacted as by briquetting and recycled to the fluid bed in unit 2 or recycled directly if desired.

The residual gas phase, now free of entrained solid particles, leaves vessel 9 via stream 11 and passes into catalytic converter 12 above upper fixed catalyst bed 13. The catalyst in bed 13 and in lower fixed catalyst bed 14 within unit 12 will preferably be identical with the catalytic material of the fluid bed in unit 2, however different catalyst compositions may be employed in beds 13 and 14 from that provided in unit 2. In any case, the catalytic material of fixed beds 13 and 14 will conform to the critical characteristic of the catalytic fluid bed of unit 2, namely in that the material will be provided with an internal surface area of 10 to 80 square meters per gram. The particle size distribution is not as small for beds 13 and 14 as in the case of the fluid bed in unit 2, and in any case this is not a critical factor.

The mixed gas stream passes downwards in series through beds 13 and 14, and the residual urea content of the gas stream is substantially completely converted to melamine under the process conditions maintained in unit 12. Ammonia vapor streams 15 and 16, preferably at a temperature below 500° F., are added to the main process gas stream immediately above the fixed beds 13 and 14 respectively. Addition of ammonia vapor streams 15 and 16 at the upper surface of beds 13 and 14 respectively serves to moderate the exothermic melamine synthesis reaction, thus providing essentially isothermal operation and avoiding excessive temperature rises in the upper portions of the fixed beds which could lead to ammonia decomposition or the formation of melamine decomposition products. Process operating temperature in beds 13 and 14 is thus maintained preferably in the range of 600° F. to 750° F., since below 600° F. less complete conversion of urea to melamine is attained and above 750° F. some decomposition of ammonia may occur. A preferable operating temperature range of 650° F. to 700° F. will be maintained in beds 13 and 14 in practice, to permit optimum operation while allowing for temperature fluctuations due to possible process upsets.

The fully converted process gas stream 17 now leaves vessel 12 below lower bed 14, and contains principally melamine vapor, ammonia and carbon dioxide. In some cases unreacted urea and the melamine precursors mentioned supra may be present in stream 17 in small amounts. The mixed gas stream 17 passes to gas cooler-condenser 18, in which the gas stream is cooled to a final temperature below 610° F., which is the sublimation point of solid melamine. Unit 18 is schematically shown as being provided with cooling coil 19, and cooling fluid inlet stream 20 and outlet stream 21. In practice, a direct aqueous liquid quench may be provided instead of heat exchange unit 18. The resulting gas stream 22 now contains crude solid melamine entrained in the residual gas phase. Stream 22 now passes to gas-solids separator 23, which is typically a cyclonic shaped unit provided with internal baffles, not shown. The solids component of stream 22, consisting of crude solid melamine, settles by gravity flow to the bottom of unit 23 and is removed to product utilization as stream 24. The residual off-gas phase consisting of a mixture of ammonia and carbon dioxide is withdrawn from unit 23 via stream 25, and is passed to further utilization. Off-gas stream 25 may be reacted with nitric acid, not shown, to produce by-product ammonium nitrate. Alternatively, stream 25 may be utilized in urea synthesis, as described in U.S. patent application No. 264,637, filed March 12, 1963, now U.S. Patent No. 3,239,522.

Various alternatives may be practiced within the scope of the present invention. Thus, the fixed bed catalytic conversion of urea to melamine is shown as taking place in two fixed beds. Alternatively, this may be carried out in a single fixed bed, however temperature control by ammonia vapor injection is more difficult in this case. It will be evident that more than two fixed beds may be employed, with apparatus capital cost being a limiting factor.

As mentioned supra, the recovery of solid melamine from the product gas stream 17 may be carried out by the use of an aqueous quench liquid wash. In this case, stream 24 would consist of a slurry of solid melamine in aqueous quench liquor, with recovery of solid product melamine taking place by filtration, centrifuging, or other conventional means.

Finally, the heat exchange coil 3 provided for maintenance of elevated temperature in the fluid bed of unit 2 may alternatively be replaced by an electric resistor heating element or other suitable heating means well known to the art.

An example of practical application of the process of the present invention will now be described.

*Example*

A pilot plant facility was operated in accordance with the present invention. Process variables were investigated, including variation of ammonia:urea feed ratio to the fluid bed. The fluid bed vaporizer-converter was operated at a temperature of 750° F., and contained a fluid bed consisting of activated alumina having an internal surface area of 63 square meters per gram and a particle size distribution between 60 and 150 mesh. The operating pressure was nominally atmospheric and was maintained at less than 30 p.s.i.g. Run duration in all cases was 30 hours. Following are the data results obtained.

TABLE I.—FLUID BED VAPORIZER—CONVERTER

| Run No | 1 | 2 | 3 |
| --- | --- | --- | --- |
| Weight Ratio, Ammonia/Urea | 1.3 | 1.8 | 2.3 |
| Urea Feed Rate Into Bed [1] | 67 | 47.5 | 25 |
| Equivalent Urea Feed Rate [2] | 0.45 | 0.32 | 0.25 |
| Melamine Yield, percent | 51 | 63 | 76 |

[1] Pounds of urea per hour per square foot of bed cross-section.
[2] Pounds of urea per hour per pound of catalyst.

It will be evident from the results of Table I that substantial catalytic conversion of urea to melamine was attained in the fluid bed vaporizer-converter. In addition, catalyst loss due to attrition and dusting was negligible. It was concluded that the catalytic fluid bed vaporizer-converter was feasible for sustained commercial operation without catalyst loss. Overall thermal requirements for vaporization of the urea were substantially below the stoichiometric amount, due to in situ exothermic melamine synthesis.

A fixed bed catalytic converter was operated in accordance with the present invention, employing catalytic materials having internal surface area in the 10 to 80 square meters per gram range. Feed to the fixed bed consisted of urea vapor which had been produced in a fluid bed vaporizer, with partial in situ conversion of urea to melamine taking place. Thus the process feed stream to the fixed bed catalytic converter contained urea vapor, melamine vapor, ammonia and carbon dioxide. A small amount of melamine precursors was also present in the feed stream. Two fixed bed runs were made, employing different catalysts as specified infra. Operating pressure was substantially atmospheric. Following are the results obtained.

TABLE II.—FIXED BED CONVERTER

| Run No | 1 | 2 |
| --- | --- | --- |
| Bed Temperature, °F | 750 | 700 |
| Catalyst Type | (1) | (2) |
| Catalyst Internal Surface Area [3] | 60 | 19 |
| Ammonia/Urea Weight Ratio | 1.6 | 1.55 |
| Total Feed Rate [4] | 0.15 | 0.16 |
| Melamine Yield, percent | 92.5 | 88.5 |

[1] Alumina.
[2] Urea-Carbon Black-Phosphoric Acid.
[3] Square meters per gram.
[4] Total pounds feed urea to fluid bed/pound catalyst in fixed bed/hour.

It is evident that commercially acceptable melamine yields were obtained employing fixed bed catalytic material in accordance with the present invention.

It will be apparent that other melamine precursors such as biuret and cyanuric acid may also be employed as the process feed to the catalytic fluid bed vaporizer of the present invention. Thus, it will be understood that such other melamine precursors are functionally equivalent to a urea feed stream in the process of the present invention, and therefore that the process of the present invention is not limited to the use of urea as a feed material, but rather that the other melamine precursors mentioned supra are contemplated as suitable equivalent feed materials within the scope of the present invention.

I claim:
1. In the process for the synthesis of melamine from urea in which a gas stream principally containing vaporized urea, melamine precursors and ammonia is passed through a catalytic bed containing solid catalyst particles, a product gas streams comprising melamine, ammonia and carbon dioxide is withdrawn from said catalyst bed, said product gas stream is cooled to a temperature below 610° F. to condense solid melamine, and product solid melamine is separated from residual mixed off-gas comprising ammonia and carbon dioxide, the improvement which comprises providing activated alumina particles having an internal surface area in the range of 10 to 80 square meters per gram as said solid catalyst particles in said catalyst bed.

2. The process of claim 1, in which said gas stream is passed through said catalyst bed at a temperature in the range of 520° F. to 750° F.

3. The process of claim 1, in which said catalyst bed is a fluid bed which is fluidized by passing ammonia vapor into said bed in a weight ratio of at least 0.7:1 relative to urea.

4. In the process for the synthesis of melamine from urea in which urea is vaporized in a catalytic fluid bed containing solid catalyst particles, said fluid bed being fluidized by passing ammonia vapor into said fluid bed, whereby said ammonia vapor rises through said fluid bed and mixes with generated urea vapor, an intermediate process gas stream principally comprising vaporized urea, melamine precursors, melamine, ammonia and carbon dioxide is withdrawn from said fluid bed, said intermedaite process gas stream is passed through a catalytic fixed bed containing solid catalyst particles, a product gas stream comprising melamine, ammonia and carbon dioxide is withdrawn from said fixed bed, said product gas stream is cooled to a temperature below 610° F. to condense solid melamine, and product solid melamine is separated from residual mixed off-gas comprising ammonia and carbon dioxide, the improvement which comprises providing activated alumina particles having an internal surface area in the range of 10 to 80 square meters per gram as said solid catalyst particles in said catalytic fluid bed.

5. The process of claim 4, in which said solid catalyst particles in said catalytic fixed bed comprise activated alumina particles having an internal surface area in the range of 10 to 80 square meters per gram.

6. The process of claim 4, in which said fluid bed is heated to a temperature in the range of 520° F. to 750° F. by internal heat exchange means, and said intermediate process gas stream is passed through said catalytic fixed bed at a temperature in the range of 600° F. to 750° F.

7. The process of claim 4, in which said ammonia vapor is passed into said fluid bed in a weight ratio of at least 0.7:1 relative to urea.

8. The process of claim 4, in which said fluidizing ammonia vapor is passed into said fluid bed in a weight ratio to urea of about 1.5:1.

9. The process of claim 4, in which said catalytic fixed bed is divided into a plurality of portions in series, and interbed cooling of the process gas stream is provided between catalyst bed portions.

10. The process of claim 9, in which the number of portions is two.

References Cited by the Examiner
UNITED STATES PATENTS

| 3,093,644 | 6/1963 | Steggerda | 260—249.7 |
| 3,095,416 | 6/1963 | Crowley et al. | 260—249.7 |

FOREIGN PATENTS

| 910,198 | 11/1962 | Great Britain. |
| 915,234 | 1/1963 | Great Britain. |

WALTER A. MODANCE, *Primary Examiner.*

J. M. FORD, *Assistant Examiner.*